United States Patent

Harris

(10) Patent No.: US 7,796,940 B2
(45) Date of Patent: Sep. 14, 2010

(54) PERSONAL AUDIO PLAYER WITH WIRELESS FILESHARING AND RADIO RECORDING AND TIMESHIFTING

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 954 days.

(21) Appl. No.: 11/115,842

(22) Filed: Apr. 26, 2005

(65) Prior Publication Data

US 2009/0099670 A1    Apr. 16, 2009

(51) Int. Cl.
    *H04H 7/00*    (2006.01)
(52) U.S. Cl. ............... 455/3.06; 455/3.02; 455/456.1; 455/414.3; 725/35; 725/138; 725/46; 725/61
(58) Field of Classification Search .......... 455/414.1, 455/414.3, 407, 412.2, 3.06, 344, 3.01–3.04, 455/412.1, 413, 550.1, 456.1; 709/231, 203, 709/217; 725/34, 35, 81, 138, 139, 115–118, 725/46, 61
See application file for complete search history.

(56) References Cited

U.S. PATENT DOCUMENTS

| | | | |
|---|---|---|---|
| 6,363,062 B1* | 3/2002 | Aaronson et al. | 370/348 |
| 6,654,367 B1* | 11/2003 | Kaufman | 370/356 |
| 6,879,822 B2* | 4/2005 | Silvester | 455/412.1 |
| 6,904,264 B1* | 6/2005 | Frantz | 455/3.04 |
| 6,957,041 B2* | 10/2005 | Christensen et al. | 455/3.06 |
| 7,224,939 B2* | 5/2007 | Takayama et al. | 455/45 |
| 2001/0000540 A1* | 4/2001 | Cooper et al. | 711/104 |
| 2002/0016165 A1* | 2/2002 | Davies et al. | 455/414 |
| 2004/0143349 A1* | 7/2004 | Roberts et al. | 700/94 |
| 2004/0193402 A1* | 9/2004 | Nolan et al. | 704/200.1 |
| 2005/0085183 A1* | 4/2005 | Lee | 455/3.01 |
| 2005/0183120 A1* | 8/2005 | Jain et al. | 725/46 |
| 2006/0140098 A1* | 6/2006 | Champion et al. | 369/59.21 |
| 2007/0087686 A1* | 4/2007 | Holm et al. | 455/3.06 |
| 2007/0124794 A1* | 5/2007 | Marko et al. | 725/135 |
| 2007/0168543 A1* | 7/2007 | Krikorian et al. | 709/231 |
| 2008/0177994 A1* | 7/2008 | Mayer | 713/2 |

* cited by examiner

*Primary Examiner*—Sujatha Sharma
(74) *Attorney, Agent, or Firm*—The Law Office of Scott C. Harris, Inc.

(57) ABSTRACT

A portable MP3 player, which includes radio capability therein. The device includes a radio part which enables receiving radio, either over the airwaves, or via a network. The radio information can be time shared for later use, and sequences within the radio information can be identified for storage within the memory. The memory can store compressed information, such as MP3 information, indicative of songs which are stored. The memory can also store information that is received over the radio.

11 Claims, 2 Drawing Sheets

PERSONAL AUDIO PLAYER WITH WIRELESS FILESHARING AND RADIO RECORDING AND TIMESHIFTING

BACKGROUND

Personal audio players, such as the Apple iPod, store compressed data indicative of music information in a storage unit. This enables a user to listen to their own personal music, on this portable device. These devices conventionally store the music in either MP3 format, or in some other compressed format. The format for storage enables a fixed-size storage device to actually store more information as compared with an uncompressed file system.

A user interface on the device may include a selector and display screen that enables the user to select a particular object to be listened to. For example, the user may select a song or a playlist and listen to that song or playlist.

SUMMARY

The present application teaches new aspects which can be included within the existing circuitry within such a portable audio device. A first aspect includes a radio, and includes control of the radio in a way that allows effectively timeshifting the radio content. The user can listen to radio content which occurred some time prior to the current-listening time. The user can also fast forward over certain parts, to enable the user to listen to only certain desired portions of the program. In addition, since the contents of the radio are compressed and stored, another aspect enables the user to store clips from the radio sequence for later playback.

Another aspect relates to a wireless capability of such a personal audio player. The wireless capability enables connection to a backbone, and enables retrieving either streaming content or standard digital content from that wireless backbone. For example, this may enable playing an Internet radio station based on wireless communication.

BRIEF DESCRIPTION OF THE DRAWINGS

These and other aspects will now be described in detail with reference to the accompanying drawings, wherein.

DETAILED DESCRIPTION

Figure 1:
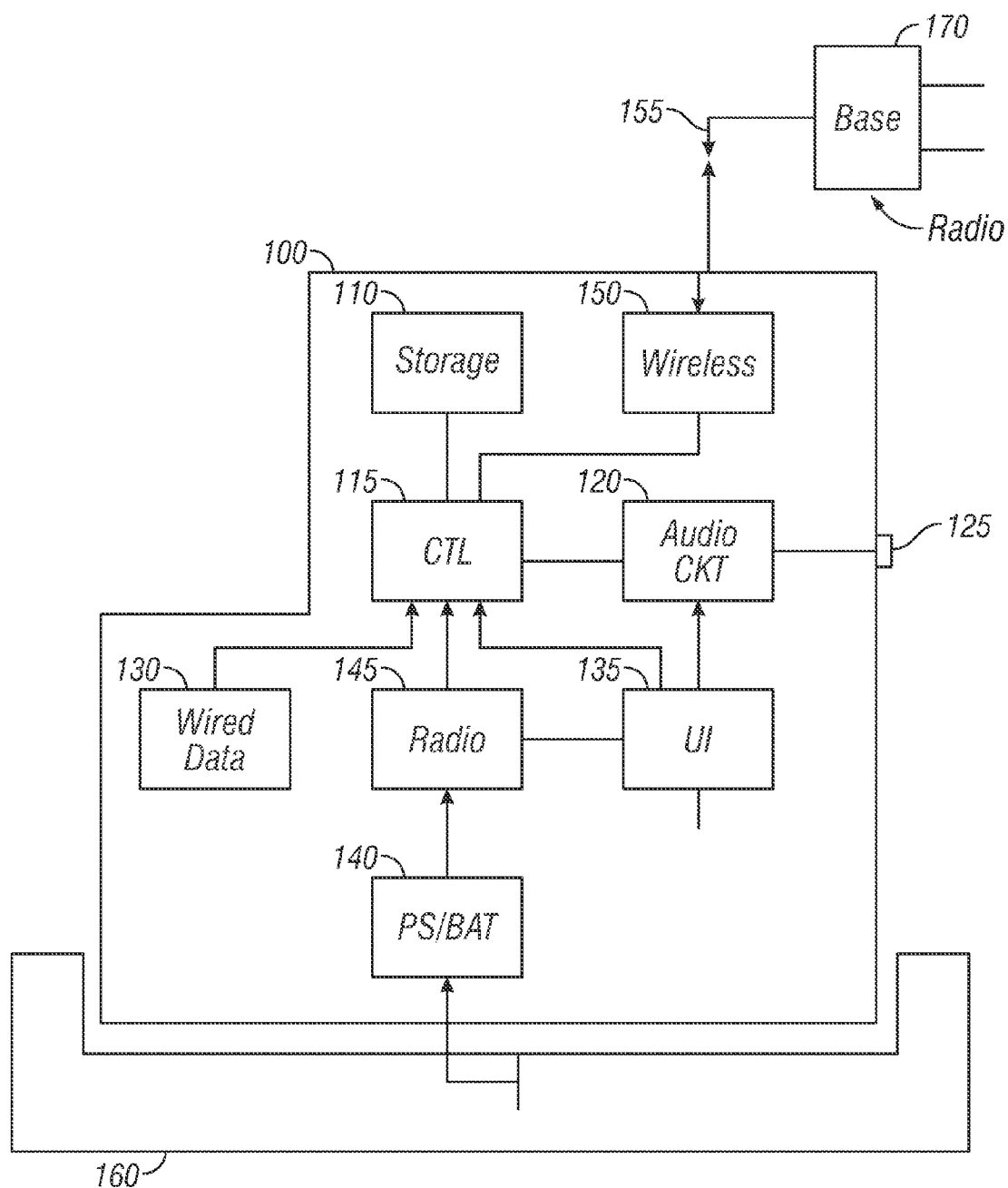
FIG. 1 shows a block diagram of the overall system.

A block diagram of the overall system is shown in FIG. 1. The unit 100 is a portable personal audio unit. A storage 110 which may be fixed or removable, stores the audio information, in preferably compressed digital form. For example, storage 110 may store between 1 MB and 400 MB of digital MP3 information in an embodiment. A controller 115 may control compression of audio information for storage into the storage unit 110, decompression of the audio information, and also control of the various functionalities. The control 115 may be more than one device, for example it may include a microprocessor and a dedicated compressor and/or decompressor IC chip.

The decompressed audio information is sent to an audio circuit 120, which may be a low wattage audio amplifier that produces an output to an earphone jack as output 125. The system also includes an interface to a wired data connection 130. For example, this may be conventional USB connection, or may be any connection which enables data from an external source to be entered into and/or removed from the storage unit 110.

The overall control is controlled by the user interface 135 which may be a selector device and may include a screen to enable displaying the contents of what is possible to play, or what is currently playing or more. A power supply 140 may include a battery, preferably a rechargeable battery that powers the entire unit.

The system also includes a radio 145 which may be a dedicated chip or may be part of one of the other chips described above. The radio may be a radio tuner with its antenna embedded into the case of the unit 100. Tuning may be controlled by the user interface 135. The system also includes a wireless connection 150 which may be a short-range connection such as Bluetooth, a network mesh connection such as Zigbee, or a more conventional wireless Ethernet connection such as 802.11. In an embodiment, the wireless connection 150 is adapted for short-range communications, so that it can receive communications when it comes within range of an appropriate communication system. In the embodiment which uses Zigbee, the wireless communication becomes part of a low-power mesh network. Each unit then becomes part of a "mesh" which receives from another node in the mesh, and transmits to a node in the network. According to one aspect, compressed audio information is sent from node to node.

Figure 2:
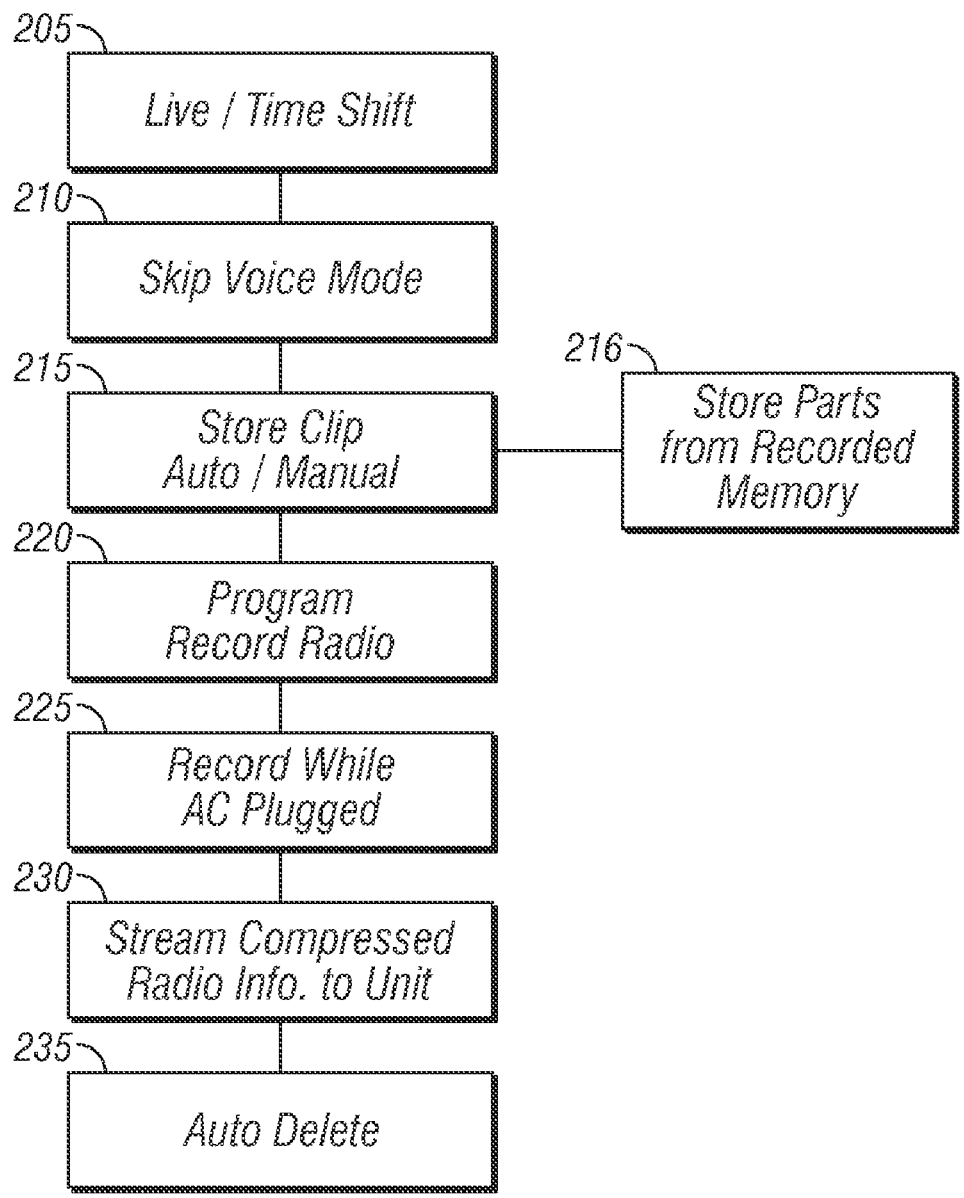
FIG. 2 shows a flowchart of operation.

In operation, the radio can play and operate in a number of different modes, which are described with reference to FIG. 2. 205 illustrates that the radio can play live, in which its output may be directly coupled through to the output connector 125. The radio can also play in a time shifted mode. In the time shifted mode, the radio contents are stored, after compression by control 115, into the storage unit. While those current contents of the radio are being stored, previous stored contents of the radio may be retrieved and sent to the audio jack 125. The user is essentially listening to time shifted radio information. The user can, from the user interface, control the listening mode (live or time-shifted), and can also control what audio is being listened to. For example, the radio may store a continual amount of storage time, for example one hour of storage. The user can listen to different parts of the radio content, and skip certain content.

In one aspect, the controller 115 automatically identifies whether the content being retrieved is voice or music, using a frequency analysis or some other type of automated content analysis. In a "skip voice" mode at 210, the playback automatically skips all information that the processing recognizes as talking, and plays only music.

Another aspect relates to storage of certain clips from the radio at 215. For example, the user may signal, while listening to a particular song, that the user wants to store this song, for later listening. The controller automatically identifies the beginning of the song, by identifying the start of the music portion for that song. Note that since the controller stores the content, it can mark that beginning, at a time previous to the time when the song is signaled, shown as 216. The controller marks that start portion as the beginning portion for clip number X. At the end of the song, the controller automatically identifies this end, also, and marks as the end of clip number X. The song is therefore stored as clip number X, into the storage unit 110, enabling the user to retrieve song X later, and play it, either for the first time, or again.

Different refinements of this system are possible. In one refinement, the user and may signal the beginning and end of the clip manually. During any song, the user selects storage, on the user interface. At that point, the user can rewind through the stored previously recorded material. The user selects start that allows manual selection of a clip from the received radio.

The clip may be stored from other playing modes, e.g., the clip maybe selected from "live" radio, as compared with during "timeshared" radio as discussed above. During the time that the user is playing live radio, in addition to being sent to the audio circuit 120, the information may be continually compressed and sent to storage unit 110, with storage unit 110 storing, for example, 5 or 10 minutes of past live radio at all times. This enables rewinding live radio, to find the beginning of a current song or program, either automatically or manually, and to enable storing that current song.

The user can also program certain radio broadcasts to be recorded at 220. For example, if the user likes a certain radio show, the user may program that radio show to be recorded. Using the user interface, the user selects record channel 99 by from 9 a.m. to 10:30 p.m. The system automatically records this, stores and within the storage 110, and enables the user to play this back as a music clip at some later time.

All of this may be relatively battery intensive, and one aspect enables doing this on a portable device. Of course this may also be done on a non-portable device. Therefore, another aspect at 225 includes recording radio transmissions for later listening automatically whenever the device is connected to its charging station 160. This can store radio during charging, based on power from the AC mains, to avoid excess battery depletion.

Yet another aspect at 230 enables the radio to be received at a base station 170 that is plugged into the AC mains. The radio information thus received is compressed to a compressed format, e.g., MP3, and then streamed into the unit over the wireless link 155, to the wireless unit 150. Alternatively, the information can be sent as discrete files, which are not streamed, and just sent as data. The radio thus recorded may be alternatively sent as wired data, the next time that the unit is synched or docked. Again, the radio show, or parts of the radio show, can then be listened to by the user.

Other information can be received over the wireless link 155. For example, when the unit comes with range of a wireless source, it may automatically begin receiving information, or signal to the user that information is available for receive. The wireless information, for example, may be an information channel, which is transmitted within an area to provide information to people on certain things. For example in a shopping mall environment, this may advertise specials about the shopping mall, or information about how to do certain things in the shopping mall. In the public exhibition, such as a zoo or art museum, the information may be information about certain exhibits, which is automatically transmitted when the user gets close to the exhibits. Alternatively, the information transmitted may be for example an entire corpus of information for all exhibits, listed by exhibit numbers, stored in the storage unit. The user can then select any of the numbers on the user interface 135, as they reach the exhibit, and listen to that information. This can also be used in other public exhibitions, such as at car shows and other shows, conventions, and other gatherings.

Another aspect may include an auto delete option. When information is received over a wireless unit, the user may be automatically prompted about whether they want to autodelete after leaving the area of the wireless unit, about whether they wish to delete the information. This marks the information to then be deleted sometime after leaving the area, e.g. 3 to 4 hours after leaving the area. This time delay prevents the information from being automatically deleted simply because the user gets to an area of low or wireless reception. The user can, of course, choose to retain parts of the information in the storage, and can select portions of that information as clips.

Other aspects are within the disclosed embodiment

Although only a few embodiments have been disclosed in detail above, other modifications are possible, and this disclosure is intended to cover all such modifications, and most particularly, any modification which might be predictable to a person having ordinary skill in the art. For example, while the above has described storage of compressed information, it should be understood that some information, especially that information intended to be later deleted, can be uncompressed information. Only the long term stored information needs to be compressed information.

Moreover, while the above describes that the compressed audio information is MP3 information, it should be understood that any compression format for the audio information can be used, e.g., ATRAC, or any other compression.

Also, only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method, comprising:
   obtaining information indicative of a broadcast that is specific to an area;
   compressing at least said specified parts, and storing at least said parts of said information as compressed audio information;
   entering an auto delete command and entering an indication of a time; and
   using said auto delete command to cause stored information from the broadcast to be automatically deleted at said time indicated by said indication.

2. An apparatus comprising:
   a connection to an audio source, which obtains audio information from a channel;
   a compressor and decompressor part, operating to compress said audio into a compressed format, and to decompress the audio from said compressed format into an uncompressed format for listening;
   a selector part that enables selecting of specified parts of said information representing a beginning part of a song within said audio information and an ending part of said song within said audio information, and uses said audio information to store compressed information in said storage unit;
   a storage unit, which stores compressed audio information, coupled to said compressor and decompressor, and storing audio information that is compressed by said compressor and providing audio information to said decompressor for playing; and
   a player control, allowing playing of a song defined between said beginning part and said ending part, without playing a remaining part of the audio information received over the channel;
   a battery, powering said device, and a charging port for said battery; and
   a recording control part, which automatically controls said compressor and decompressor part to automatically record said audio information into said storage unit whenever the device is connected to said charging port, and not to automatically record when the device is not connected to said charging port.

3. An apparatus as in claim 2, wherein said channel is a radio, and said compressed information is radio information that includes complete transmissions of radio information, which can be played after storing in a time shifted mode that allows playing back the stored radio information.

4. An apparatus as in claim 2, wherein said player control enables clips within said information to be identified and stored, where at least part of a stored clip is a part which previously played, prior to a time of initiating storage.

5. An apparatus as in claim 3, wherein said player control controls playing back said information as time shifted information, which enables clips within said radio information to be identified and stored, said clips having a beginning time and an ending time, where at least part of a stored clip is a part wherein said beginning is at a previous time point within the time shifted information, and wherein said end is at a later time point in the time shifted information.

6. An apparatus as in claim 2, wherein said channel is a radio channel that is received over a network connection in a compressed format.

7. An apparatus as in claim 2, wherein said channel is specific to an area, and further comprising an auto delete command, which includes entry of a specific time, which commands stored information from the audio to be automatically deleted at a time related to said specific time, measured relative to a time when the area is left and the audio is no longer being received.

8. An apparatus as in claim 2, further comprising a wireless mesh network, and wherein said information is received over said wireless mesh network.

9. An apparatus comprising:
a memory;
an audio processor including an audio compressing part, which receives audio information to be stored in said memory and compresses said audio information prior to storing in said memory, and an audio decompression part, which receives compressed information from said memory, and decompresses said information to output an uncompressed data;
a selector part that enables selecting of specified parts of said information representing a beginning part of a song within said audio information and an ending part of said song within said audio information, and uses said audio information to store compressed information in said storage unit;
a storage unit, which stores compressed audio information, coupled to said compressor and decompressor, and storing audio information that is compressed by said compressor and providing audio information to said audio processor for playing;
audio circuitry, allowing producing an audio output indicative of decompressed information from said audio processor; and
a network part, wherein said network part is a part for a mesh network, which allows receiving information from other nodes in the mesh network, and transmitting information to said other nodes in said mesh network, wherein said information which is sent and received over said mesh network includes compressed audio information; and
wherein said selector part enables information received over the mesh network to be stored, and determines a time when an area is left, and
where said auto delete command commands stored information from the broadcast received over the mesh network to be automatically deleted at a later time, where said later time is a time measured relative to said time when the area is left.

10. An apparatus as in claim 9, wherein said information received over is the audio mesh network includes compressed radio transmission information.

11. An apparatus as in claim 9, further comprising a user interface which enables selecting portions of information received over said mesh network, and storing said portions as identified clips which can be played by selecting an identifier associated with a portion.

* * * * *